United States Patent
Sun

(10) Patent No.: US 10,674,088 B2
(45) Date of Patent: Jun. 2, 2020

(54) METHOD AND DEVICE FOR ACQUIRING IMAGE, TERMINAL AND COMPUTER-READABLE STORAGE MEDIUM

(71) Applicant: BEIJING XIAOMI MOBILE SOFTWARE CO., LTD., Beijing (CN)

(72) Inventor: Heng Sun, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/239,854

(22) Filed: Jan. 4, 2019

(65) Prior Publication Data
US 2019/0215455 A1 Jul. 11, 2019

(30) Foreign Application Priority Data
Jan. 10, 2018 (CN) .......................... 2018 1 0022466

(51) Int. Cl.
*H04N 5/232* (2006.01)
*G06K 9/00* (2006.01)
*H04N 5/235* (2006.01)

(52) U.S. Cl.
CPC ..... *H04N 5/23258* (2013.01); *G06K 9/00691* (2013.01); *G06K 9/00697* (2013.01);
(Continued)

(58) Field of Classification Search
CPC ............. H04N 5/23258; H04N 5/2352; H04N 5/23267; H04N 5/23245; H04N 5/2351;
(Continued)

(56) References Cited

U.S. PATENT DOCUMENTS 5,270,802 A * 12/1993 Takagi .................. H04N 9/735
348/223.1
9,232,138 B1 1/2016 Baldwin
(Continued)

FOREIGN PATENT DOCUMENTS

CN 107026970 A 8/2017
CN 107135349 A 9/2017
(Continued)

OTHER PUBLICATIONS

Extended European Search Report to counterpart EP Application No. 191508985 dated May 16, 2019, (8p).
(Continued)

*Primary Examiner* — Ahmed A Berhan
(74) *Attorney, Agent, or Firm* — Arch & Lake LLP

(57) ABSTRACT

A method and device for acquiring an image, a terminal and a computer-readable storage medium are provided. The method includes: acquiring gyroscope data from the gyroscope while acquiring images by the camera component; obtaining a current scene for each acquired image and determining whether the current scene includes an indoor scene or an outdoor scene based on each acquired image; and determining whether to perform optical anti-shake processing on each acquired image based on the acquired gyroscope data based on whether the current scene includes the indoor scene. With the method and device for acquiring an image, the quality of the captured video image can be enhanced.

12 Claims, 5 Drawing Sheets

(52) U.S. Cl.
CPC ....... *H04N 5/2352* (2013.01); *H04N 5/23245* (2013.01); *H04N 5/23267* (2013.01)

(58) Field of Classification Search
CPC ........... H04N 5/23264; G06K 9/00697; G06K 9/00691
See application file for complete search history.

(56) References Cited

U.S. PATENT DOCUMENTS

| | | |
|---|---|---|
| 2008/0204565 A1 | 8/2008 | Yumiki |
| 2008/0303922 A1* | 12/2008 | Chaudhri ............... H04N 5/235 348/231.99 |
| 2011/0058802 A1 | 3/2011 | Forutanpour et al. |
| 2011/0234826 A1 | 9/2011 | Nguyen et al. |
| 2015/0022678 A1* | 1/2015 | Tsubaki ............. H04N 5/23254 348/208.5 |
| 2016/0360111 A1 | 12/2016 | Thivent et al. |
| 2017/0161579 A1 | 6/2017 | Gousev et al. |

FOREIGN PATENT DOCUMENTS

| | | |
|---|---|---|
| CN | 107317965 A | 11/2017 |
| WO | 2015008049 A1 | 1/2015 |

OTHER PUBLICATIONS

First Office Action of Chinese Application No. 201810022466.X dated Nov. 6, 2019, with English translation (12p).

\* cited by examiner

METHOD AND DEVICE FOR ACQUIRING IMAGE, TERMINAL AND COMPUTER-READABLE STORAGE MEDIUM

CROSS-REFERENCE TO RELATED APPLICATIONS

This application is based upon and claims priority to Chinese Patent Application 201810022466.X, filed Jan. 10, 2018, the entire contents of which are incorporated herein by reference.

TECHNICAL FILED

The present disclosure relates to a method and device for acquiring an image, a terminal and a computer-readable storage medium.

BACKGROUND

With the development of electronic technology and Internet technology, the terminals such as mobile phones and computers have been widely used. The types of application programs on the corresponding terminals are increasing and there are more and more functions. The photographing application program is a very popular application program.

The user can shoot pictures by using the photographing application program in a terminal. When shooting pictures, if the terminal shakes, then inter-frame jittering will be caused to the captured video image, and the quality of the video image is reduced. In order to improve the quality of the video image, the terminal generally uses an electronic anti-shake algorithm based on gyroscope data to smooth the inter-frame jitter of the video image. Specifically, when the photographing application program is activated to shoot pictures, the terminal can acquire the gyroscope data. Every time the video image frame is captured, the video image frame can be subject to electronic anti-shake processing based on the acquired gyroscope data. The inter-frame jitter is smoothed to acquire the smoothed video image.

In the process of implementing the present disclosure, the inventors discovered at least the following problems.

The electronic anti-shake algorithm smooths the inter-frame jitter rather than removing the motion blur of each video image frame. In some cases, the captured video image frame may have motion blur. In such case, based on the above processing mode, the terminal does not perform deblurring on each video image frame, resulting in a poor quality of the captured video image.

SUMMARY

The present disclosure provides a method and device for acquiring an image.

According to an aspect of the present disclosure, there is provided a method for acquiring an image, implemented by a terminal having a camera component and a gyroscope, comprising: acquiring gyroscope data from the gyroscope while acquiring images by the camera component; obtaining a current scene for each acquired image and determining whether the current scene includes an indoor scene or an outdoor scene based on each acquired image; and determining whether to perform optical anti-shake processing on each acquired image based on the acquired gyroscope data based on whether the current scene includes the indoor scene.

According to another aspect of the present disclosure, there is provided a device for acquiring an image, which is used for a terminal having a camera component, comprising: a processor and a gyroscope; and a memory for storing instructions executable by the processor, wherein the processor is configured to: acquire gyroscope data from the gyroscope while acquiring images by the camera component; obtain a current scene for each acquired image and determine whether the current scene includes an indoor scene or an outdoor scene based on each acquired image; and determine whether to perform optical anti-shake processing on each acquired image based on the acquired gyroscope data based on whether the current scene includes the indoor scene.

According to another aspect of the present disclosure, there is provided a terminal comprising a processor and a memory, wherein the memory stores at least one instruction, at least one program, a code set or an instruction set, and the at least one instruction, the at least one program, the code set or the instruction set is loaded and executed by the processor to implement the method for acquiring an image in the first aspect.

According to another aspect of the present disclosure, there is provided a computer-readable storage medium, wherein the storage medium stores at least one instruction, at least one program, a code set or an instruction set, and the at least one instruction, the at least one program, the code set or the instruction set is loaded and executed by the processor to implement the method for acquiring an image in the first aspect.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

The embodiments of the present disclosure are illustrated openly and clearly in the above figures, and are described in more detail subsequently. The figures and description are not intended to limit the scope of the present disclosure by any means, but rather to describe concept of the present disclosure for those skilled in the art by referring to the specific embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the invention as recited in the appended claims.

An example of the present disclosure provides a method for acquiring an image. The method may be used in a terminal. The terminal may be a mobile terminal having a camera shooting function, such as a mobile phone and a tablet computer, in which a photographing application program is installed. The terminal may comprise components, such as a processor, a memory, a screen, a camera component and so on. The processor may be a central processing unit (CPU) or the like, and may be used for the related processing of acquiring a smooth video image frame. The memory may be a random access memory (RAM), a flash memory (Flash), etc., and may be configured to store received data, data required for processing, data generated during processing, etc., such as a preset photosensitivity threshold and a preset light intensity threshold. The screen may be a touch screen, and may be configured to display the captured video image frame, and can also be configured to detect a touch signal and the like. The camera component may be a camera or the like.

Figure 1:
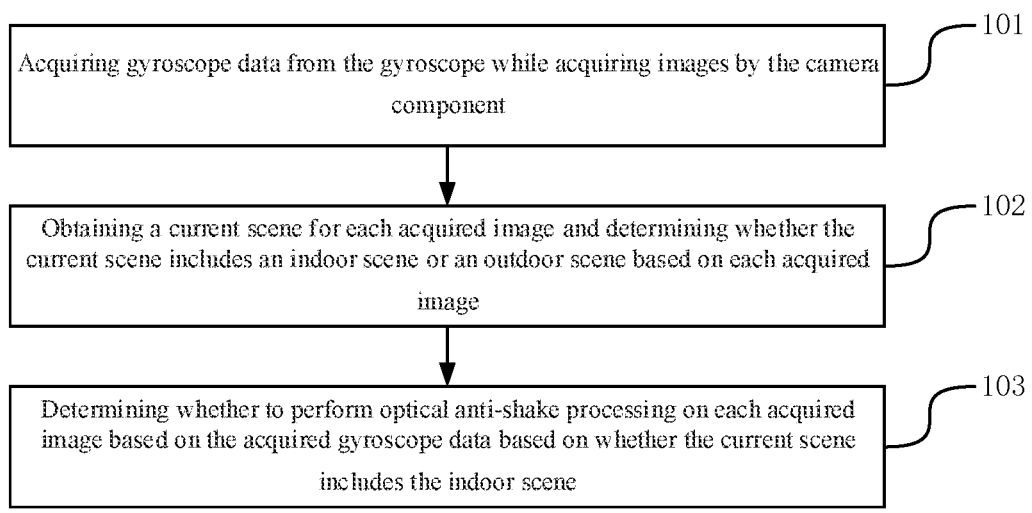
FIG. 1 is a flow chart of a method for acquiring an image according to an example.

The processing flow as shown in FIG. 1 will be described in detail below with reference to the embodiments, and the content can be as follows.

In step 101, gyroscope data are acquired from the gyroscope while acquiring images by the camera component.

Here, the gyroscope data may be the data detected by a gyroscope sensor in the terminal.

In the implementation, a photographing application program that can be configured to acquire an image (camera shooting) may be installed in the terminal. The user may trigger the terminal to acquire the image by using the photographing application program. The terminal acquires the image through the camera component. In the process of acquiring the image, the terminal may acquire the gyroscope data. Specifically, the terminal may acquire the gyroscope data periodically based on a preset time period when the terminal starts to shoot the video image frame, and obtain multiple sets of gyroscope data corresponding to each video image frame. For example, the duration of each video image frame is 33 milliseconds (ms), and the preset time period is 5 ms. In such case, the terminal can acquire the gyroscope data when starting to shoot certain video image frame, and then can acquire the gyroscope data every other 5 ms. The preset time period may be any duration between 1 ms and 10 ms, where the preset time period may be adjusted by the user. Alternatively or additionally, the preset time period may be adjusted based on moving speed of the terminal. The terminal can stop acquiring the gyroscope data after the video image frame is acquired by photographing (i.e., after the video image frame photographing ends). At this point, the multiple sets of gyroscope data corresponding to the video image frame are acquired (in such case, each video image frame corresponds to six sets of gyroscope data).

In step 102, a current scene for each acquired image is obtained and whether the current scene includes an indoor scene or an outdoor scene is determined based on each acquired image.

In the implementation, the terminal may determine the current scene when receiving a start instruction of acquiring an image, and determine the acquired judgment result as the current scene. That is, different processing manners may be adopted according to different judgment results. In other words, if the current scene is the indoor scene, the optical anti-shake processing is performed based on the acquired gyroscope data to acquire each video image frame subjected to the optical anti-shake processing. If the current scene is the outdoor scene, each video image frame without the optical anti-shake processing is acquired. Alternatively, in the process of acquiring the image, the terminal may determine the current scene every other preset period of judgment, and determine the acquired judgment result as the current scene. In such case, respective video image frames in the video after the video recording is ended possibly comprise both the smooth video image frame acquired by performing both of the electronic anti-shake processing and the optical anti-shake processing, and the smooth video image frame acquired by only performing the electronic anti-shake processing based on the gyroscope data.

Optionally, based on the different judging manners for the current scene, there may be various determining manners for the current scene. Several feasible processing manners are given below.

The first manner is to acquire the currently configured photosensitivity suitable for the camera component. If the photosensitivity is greater than a preset photosensitivity threshold, the current scene is determined as the indoor scene. If the photosensitivity is less than the preset photosensitivity threshold, the current scene is determined as the outdoor scene.

In the implementation, in a semi-automatic mode or a fully automatic mode, the terminal will automatically match the photosensitivity suitable for the camera component according to the ambient brightness. In such a case, the terminal may acquire the currently configured photosensitivity (ISO). Further, the acquired photosensitivity can be compared with the preset photosensitivity threshold. If the acquired photosensitivity is greater than the preset photosensitivity threshold, then the terminal can determine the current scene as the indoor scene. If the photosensitivity is less than the preset photosensitivity threshold, the current scene may be determined as the outdoor scene.

The second manner is to acquire the ambient light intensity value by using a light sensor. If the ambient light intensity value is less than the preset light intensity threshold, the current scene is determined as the indoor scene. If the ambient light intensity value is greater than the preset light intensity threshold, the current scene is determined as the outdoor scene.

In the implementation, the terminal may comprise a light sensor. In such a case, the terminal may acquire the ambient light intensity value by the light sensor, and then may compare the acquired ambient light intensity value with the preset light intensity threshold. If the acquired ambient light intensity value is less than the preset light intensity threshold, the current scene may be determined as the indoor scene. If the ambient light intensity value is greater than the preset light intensity threshold, the current scene may be determined as the outdoor scene In step 103, whether to perform optical anti-shake processing on each acquired image based on the acquired gyroscope data is determined based on whether the current scene includes the indoor scene.

Optionally, when determining that a current scene includes an indoor scene, the optical anti-shake processing is performed based on the acquired gyroscope data by the camera component, to acquire each video image frame subjected to the optical anti-shake processing.

Here, the indoor scene may also be referred as a weak (or dark) scene, that is, a scene with weak (or dark) ambient light.

In the implementation, in the process of acquiring the image, the terminal may further determine the current scene. If the current scene is the indoor scene, the terminal may perform the optical anti-shake processing based on the acquired gyroscope data by the camera component, to acquire each video image frame subjected to the optical anti-shake processing. Since the exposure duration is relatively large under the indoor brightness corresponding to the indoor scene, it is likely to cause motion blur of the captured video image frame if the terminal is shaken, at this time. Therefore, in the indoor scene, the terminal can perform the optical anti-shake processing and electronic anti-shake processing in a mixing manner.

Optionally, in an outdoor scene, the terminal may determine to only perform the electronic anti-shake processing. Correspondingly, the terminal may also perform the following processing: if the current scene is an outdoor scene, each video image frame without the optical anti-shake processing is acquired by the camera component. For each acquired video image frame without the optical anti-shake processing, based on the gyroscope data corresponding to the associated video image frames corresponding to the video image frame, the electronic anti-shake processing is performed on the video image frame to acquire a smooth video image frame. For example, the terminal may turn off the optical anti-shake module when determining that the current scene is an outdoor scene.

Here, the outdoor scene can also be referred as a strong light (or bright) scene, that is, a scene with stronger (or brighter) ambient light.

Figure 2:
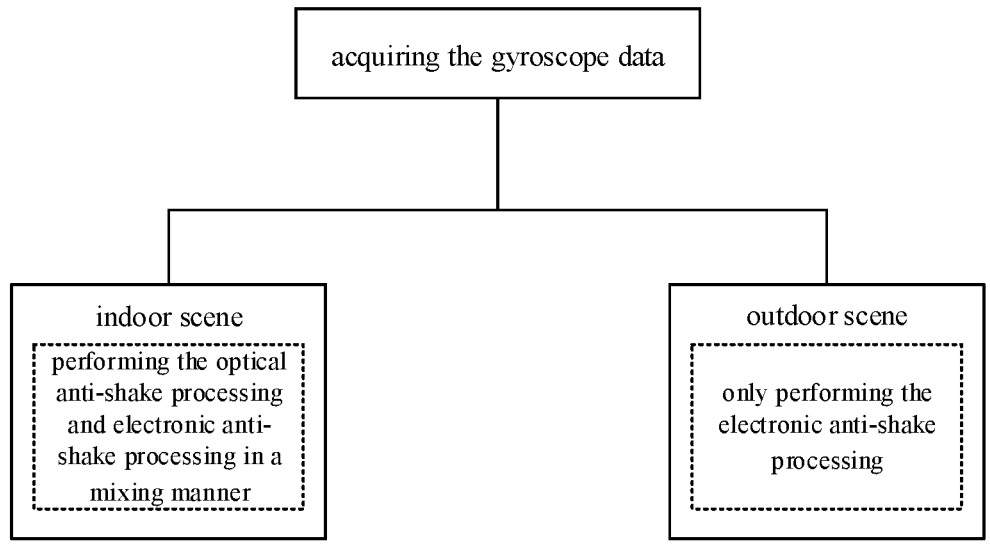
FIG. 2 is a schematic diagram of an anti-shake processing according to an example.

In the implementation, if the current scene is the outdoor scene, the terminal may not perform the optical anti-shake processing, and only perform the electronic anti-shake processing, as shown in FIG. 2. Specifically, if the current scene is the outdoor scene, the terminal may acquire the video image frame without the optical anti-shake processing by the camera component without performing the optical anti-shake processing any more. Further, for each acquired video image frame without the optical anti-shake processing, the terminal may determine the associated video image frames corresponding to the video image frame, and then, may acquire the gyroscope data corresponding to the associated video image frames. After acquiring the gyroscope data corresponding to the associated video image frames, the terminal may perform the electronic anti-shake processing on the video image frame to acquire the smooth video image frame based on the pre-stored gyroscope data-based electronic anti-shake algorithm (Gyro-Based EIS (Electronic Image Stabilization)) and the acquired gyroscope data corresponding to the associated video image frames. Since the exposure duration is relatively short under the outdoor brightness corresponding to the outdoor scene, the probability that the captured video image frame has motion blur caused by jitter of the terminal is small at this time. Therefore, in the outdoor scene, the terminal can only perform the electronic anti-shake processing.

In an implementation, after acquiring the gyroscope data, the camera component may perform optical anti-shake processing based on the acquired gyroscope data, to acquire each video image frame subjected to the optical anti-shake processing. That is, the gyroscope data may be used as an input of to the camera component, such that the camera component is subjected to the optical anti-shake processing to acquire each video image frame subjected to the optical anti-shake processing. Regarding the case of acquiring the gyroscope data, after acquiring each set of gyroscope data, the terminal may perform optical anti-shake processing based on the acquired gyroscope data, to acquire each video image frame subjected to the optical anti-shake processing. That is, in the process of acquiring each video image frame, the terminal may perform optical anti-shake processing based on acquired each acquired set of gyroscope data.

In the implementation, after each video image frame subjected to the optical anti-shake processing is acquired, for each acquired video image frame subjected to the optical anti-shake processing, the terminal may determine the associated video image frames corresponding to the video image frame. Further, the image data of the associated video image frames may be acquired, where the associated video image frames corresponding to the video image frame may comprise such video image frame. When determining the associated video image frames, the terminal may determine a first preset number of video image frames before the video image frame and the video image frame per se as the associated video image frames, or may determine all the video image frames before the video image frame and the video image frame per se as the associated video image frames. Or the terminal performs electronic anti-shake processing after acquiring a second preset number of video image frames. In such case, the terminal may determine a third preset number of video image frames after the video image frame and the video image frame per se as the associated video image frames.

After acquiring the image data of the associated video image frames, the terminal may perform the electronic anti-shake processing on the video image frame based on the pre-stored image data-based electronic anti-shake algorithm (Image-Based EIS (Electronic Image Stabilization)) and the image data of the associated video image frames corresponding to the video image frame, to acquire a smooth video image frame. The terminal may determine the inter-frame jitter condition based on the distance of corresponding feature points in respective associated video image frames, and further perform electronic anti-shake processing on the video image frame according to the inter-frame jitter condition. That is, the inter-frame jitter is smoothed to acquire a smooth video image frame. The terminal can store the acquired smooth video image frame. The acquired smooth video image frame is the video image frame in the video obtained after the image acquisition is ended. That is to say, in the present solution, in the process of acquiring the image, the terminal adopts the method of mixing the optical anti-shake processing and electronic anti-shake processing to achieve the effect of smoothing inter-frame picture of the video image in the obtained video. Thus, the quality of the captured video image can be enhanced. In addition, when the electronic anti-shake processing is performed, the terminal performs electronic anti-shake processing based on the image data instead of the gyroscope data. In this way, the fusion of the optical anti-shake processing and the electronic anti-shake processing can be realized without additional hardware.

In the embodiment of the present disclosure, in the process of image acquiring, the gyroscope data are acquired from a gyroscope while acquiring images by the camera component. A current scene for each acquired image is obtained and whether the current scene includes an indoor scene or an outdoor scene is determined based on each acquired image. Whether to perform optical anti-shake processing on each acquired image based on the acquired gyroscope data is determined based on whether the current scene includes the indoor scene. The optical anti-shake processing is to smooth the inter-frame shake. In this way, the video image finally acquired by the terminal is a video image subjected to the optical anti-shake processing and the electronic anti-shake processing, thereby the quality of the captured video image is enhanced.

Figure 3:
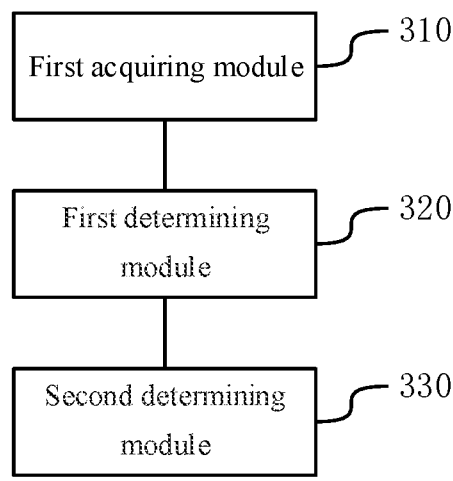
FIG. 3 is a schematic diagram of a device for acquiring an image according to an example.

There is further provided a device for acquiring an image according to another example of the present disclosure. The device is used for the terminal having a photographing component. As shown in FIG. 3, the device may be the terminal in the above embodiment. The device includes: a first acquiring module 310 configured to acquire gyroscope data from the gyroscope while acquiring images by the camera component; a first determining module 320 configured to obtain a current scene for each acquired image and determine whether the current scene includes an indoor scene or an outdoor scene based on each acquired image; and a second determining module 330 configured to determine whether to perform optical anti-shake processing on each acquired image based on the acquired gyroscope data based on whether the current scene includes the indoor scene.

Optionally, the device further includes: an optical anti-shake module 340 is configured to perform optical anti-shake processing based on the acquired gyroscope data when determining that a current scene includes an indoor scene, by the camera component, to acquire each video image frame subjected to the optical anti-shake processing; and perform, based on the image data of associated video image frames corresponding to the video image frame, electronic anti-shake processing on the video image frame, for each acquired video image frame subjected to the optical anti-shake processing, to acquire a smooth video image frame.

Figure 4:
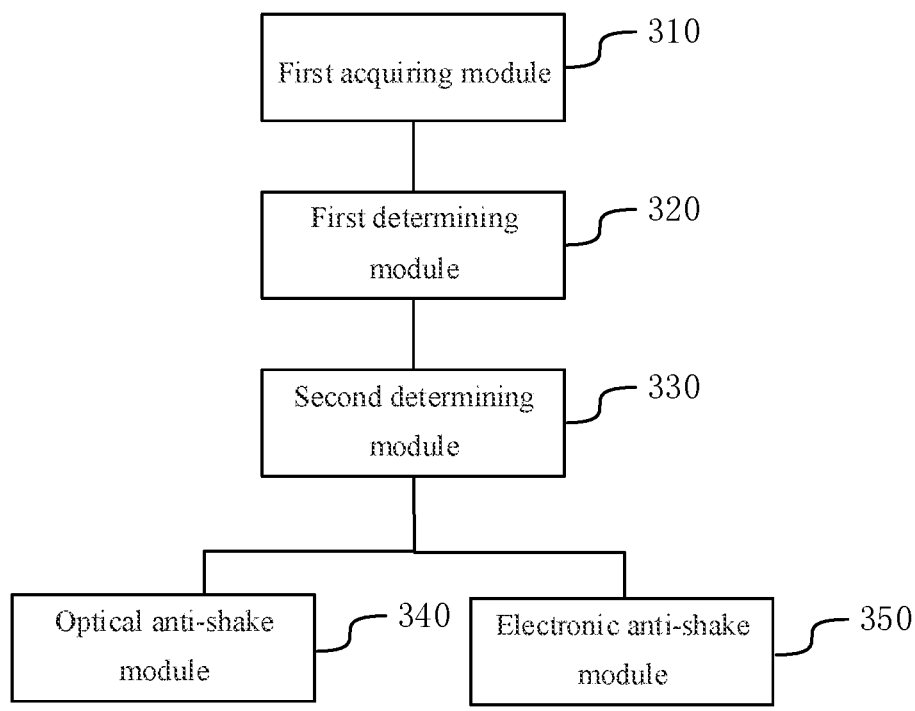
FIG. 4 is a schematic diagram of a device for acquiring an image according to an example.

Optionally, as shown in FIG. 4 the device further includes: a electronic anti-shake module 350 configured to acquire, by the camera component, each video image frame without, the optical anti-shake processing when determining that a current scene includes an outdoor scene; and perform, based on the gyroscope data corresponding to associated video image frames corresponding to the video image frame, electronic anti-shake processing on the video image frame, for each acquired video image frame without the optical anti-shake processing, to acquire a smooth video image frame.

Figure 5:
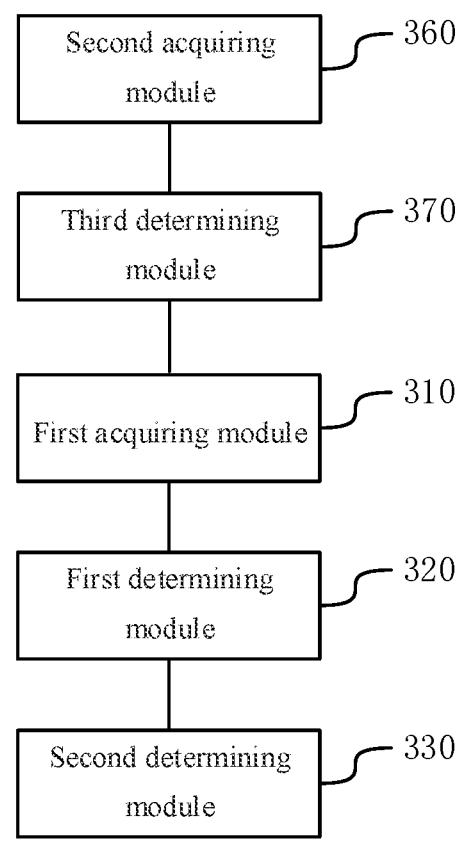
FIG. 5 is a schematic diagram of a device for acquiring an image according to an example.

Optionally, as shown in FIG. 5, the device further includes: a second acquiring module 360 configured to acquire a currently configured photosensitivity suitable for the camera component; and a third determining module 370 configured to determine that the current scene includes the indoor scene when the photosensitivity is greater than a preset photosensitivity threshold; and determine that the current scene includes the outdoor scene, when the photosensitivity is less than the preset photosensitivity threshold.

Figure 6:
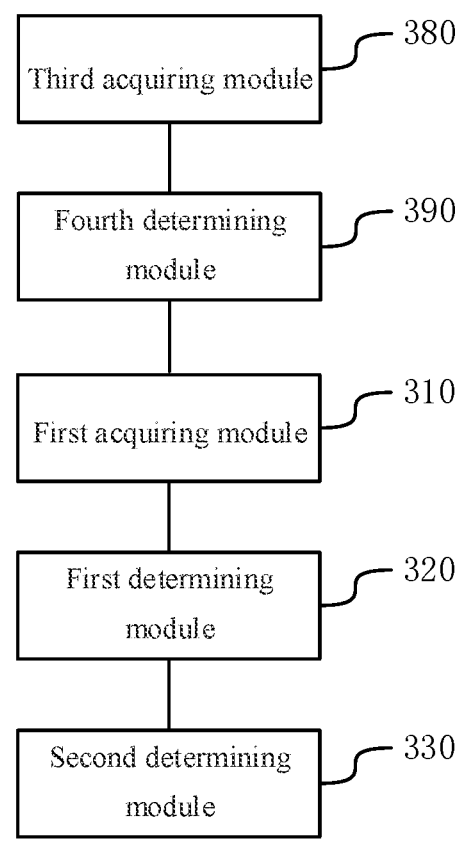
FIG. 6 is a schematic diagram of a device for acquiring an image according to an example.

Optionally, as shown in FIG. 6, the device further includes: a third acquiring module 380 configured to acquire an ambient light intensity value by a light sensor; and a fourth determining module 390 configured to, determine that the current scene includes the indoor scene, when the ambient light intensity value is less than a preset light intensity threshold; and determining that the current scene includes the outdoor scene, when the ambient light intensity value is greater than the preset light intensity threshold.

With respect to the device of the above embodiment, the specific mode of operation performed by each module has been described in details in the embodiment of the method, and the description thereof may not be described in details herein.

In the embodiment of the present disclosure, the gyroscope data are acquired from the gyroscope while acquiring images by the camera component.

A current scene for each acquired image is obtained and whether the current scene includes an indoor scene or an outdoor scene is determined based on each acquired image. Whether to perform optical anti-shake processing on each acquired image based on the acquired gyroscope data is determined based on whether the current scene includes the indoor scene. The optical anti-shake processing is to smooth the inter-frame shake. In this way, the video image finally acquired by the terminal is a video image subjected to the optical anti-shake processing and the electronic anti-shake processing, thereby the quality of the captured video image is enhanced.

It should be noted that the device for acquiring an image provided by the above embodiment is exemplified only by the above division of each of the functional modules when the device acquires an image. In practice, the above-described functions may be assigned and completed by different functional modules in accordance with requirements, such that the internal structure of the terminal may be divided into different functional modules to complete all or part of the functions described above. In addition, the device for acquiring an image and the method for acquiring an image provided in the above embodiment follow the same principal, and the specific implementation process thereof can be described in the method embodiment and may not be described again herein.

A yet another example of the present disclosure shows a schematic diagram of a structure of a terminal. The terminal may be a mobile phone, and the like.

Figure 7:
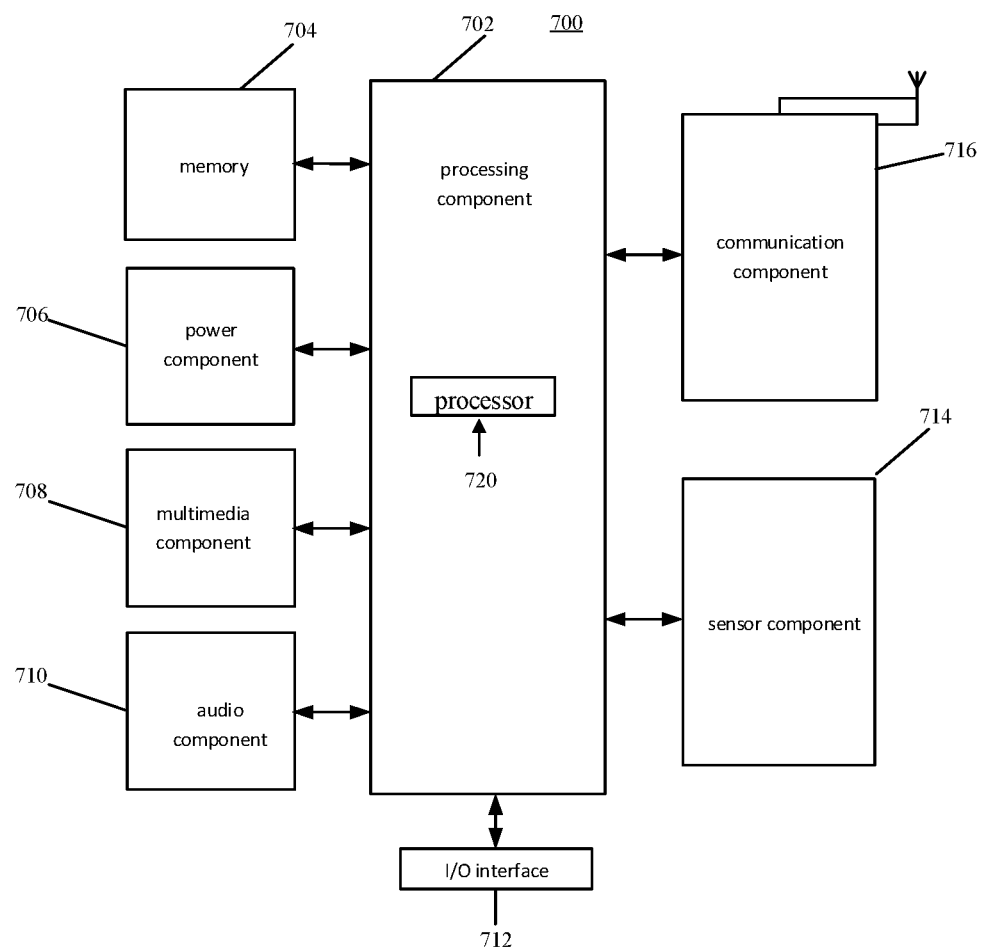
FIG. 7 is a schematic diagram of a terminal according to an example.

Referring to FIG. 7, the terminal 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the terminal 700, such as the operations associated with display, telephone calls, data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the terminal 700. Examples of such data include instructions for any applications or methods operated on the terminal 700, contact data, phonebook data, messages, pictures, video, etc. The memory 704 may be implemented using any type of volatile or nonvolatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the terminal 700. The power component 706 may include a power management system, one or more power sources, and any other components associated with the generation, management, and distribution of power in the terminal 700.

The multimedia component 708 includes a screen providing an output interface between the terminal 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and the rear camera may receive an external multimedia datum while the terminal 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone ("MIC") configured to receive an external audio signal when the terminal 700 is in an operation mode, such as a call mode, a recording mode, and a voice recognition mode. The received audio signal may be further stored in the memory 704 or transmitted via the communication component 716.

The I/O interface 712 provides an interface between the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the terminal 700. For instance, the sensor component 714 may detect an open/closed status of the terminal 700, relative positioning of components, e.g., the display and the keypad, of the terminal 700, a change in position of the terminal 700 or a component of the terminal 700, a presence or absence of user contact with the terminal 700, an orientation or an acceleration/deceleration of the terminal 700, and a change in temperature of the terminal 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the terminal 700 and other devices. The terminal 700 may access a wireless network based on a communication standard, such as WiFi, 2G, or 3G, or a combination thereof. In one example, the communication component 716 receives a broadcast signal or broadcast associated information from an external broadcast management system via a broadcast channel. In one example, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In examples, the terminal 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In examples, there is also provided a non-transitory computer-readable storage medium including instructions, such as the memory 704 including instructions. The instructions are executable by the processor 720 in the terminal 700, for performing the above-described methods. For example, the non-transitory computer-readable storage medium may be a ROM, a RAM, a CD-ROM, a magnetic tape, a floppy disc, an optical data storage device, and the like.

There is provided a non-transitory computer-readable storage medium. When the instructions in the storage medium are executed by the processor of the terminal, the terminal can perform the method for acquiring an image. The method includes steps of: acquiring gyroscope data from the gyroscope while acquiring images by the camera component; obtaining a current scene for each acquired image and determining whether the current scene includes an indoor scene or an outdoor scene based on each acquired image; and determining whether to perform optical anti-shake processing on each acquired image based on the acquired gyroscope data based on whether the current scene includes the indoor scene.

Optionally, the method further comprises: when determining that a current scene includes an indoor scene, performing optical anti-shake processing based on the acquired gyroscope data, by the camera component, to acquire each video image frame subjected to the optical anti-shake processing; and performing, based on the image data of associated video image frames corresponding to the video image frame, electronic anti-shake processing on the video image frame, for each acquired video image frame subjected to the optical anti-shake processing, to acquire a smooth video image frame.

Optionally, the method further includes: when determining that a current scene includes an outdoor scene, acquiring, by the camera component, each video image frame without the optical anti-shake processing; and performing, based on the gyroscope data corresponding to associated video image frames corresponding to the video image frame, electronic anti-shake processing on the video image frame, for each acquired video image frame without the optical anti-shake processing, to acquire a smooth video image frame.

Optionally, the method further includes: acquiring a currently configured photosensitivity suitable for the camera component; when the photosensitivity is greater than a preset photosensitivity threshold, determining that the current scene includes the indoor scene; and when the photosensitivity is less than the preset photosensitivity threshold, determining that the current scene includes the outdoor scene.

Optionally, the method further includes: acquiring an ambient light intensity value by a light sensor; when the ambient light intensity value is less than a preset light intensity threshold, determining that the current scene includes the indoor scene; and when the ambient light intensity value is greater than the preset light intensity threshold, determining that the current scene includes the outdoor scene.

In the embodiment of the present disclosure, the gyroscope data are acquired from the gyroscope while acquiring images by the camera component. A current scene for each acquired image is obtained and whether the current scene includes an indoor scene or an outdoor scene is determined based on each acquired image. Whether to perform optical anti-shake processing on each acquired image based on the acquired gyroscope data is determined based on whether the current scene includes the indoor scene. The optical anti-shake processing is to smooth the inter-frame shake. In this way, the video image finally acquired by the terminal is a video image subjected to the optical anti-shake processing and the electronic anti-shake processing, thereby the quality of the captured video image is enhanced.

Other embodiments of the invention will be apparent to those skilled in the art from consideration of the specification and practice of the present disclosure. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the present disclosure being indicated by the following claims.

It should be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for acquiring an image, implemented by a terminal having a camera component and a gyroscope, comprising:
   acquiring gyroscope data from the gyroscope while acquiring images by the camera component;
   obtaining a current scene for each acquired image and determining whether the current scene includes an indoor scene or an outdoor scene based on each acquired image;
   determining whether to perform optical anti-shake processing on each acquired image based on the acquired gyroscope data based on whether the current scene includes the indoor scene;
   when determining that a current scene includes an outdoor scene, acquiring, by the camera component, each video image frame without the optical anti-shake processing; and
   performing, based on the gyroscope data corresponding to associated video image frames corresponding to the video image frame, electronic anti-shake processing on the video image frame, for each acquired video image frame without the optical anti-shake processing, to acquire a smooth video image frame.

2. The method according to claim 1, further comprising:
   when determining that a current scene includes an indoor scene, performing optical anti-shake processing based on the acquired gyroscope data, by the camera component, to acquire each video image frame subjected to the optical anti-shake processing; and
   performing, based on image data of associated video image frames corresponding to the video image frame, electronic anti-shake processing on the video image frame, for each acquired video image frame subjected to the optical anti-shake processing, to acquire a smooth video image frame.

3. The method according to claim 1, further comprising:
   acquiring a currently configured photosensitivity suitable for the camera component; and
   when the photosensitivity is greater than a preset photosensitivity threshold, determining that the current scene includes the indoor scene; and
   when the photosensitivity is less than the preset photosensitivity threshold, determining that the current scene includes the outdoor scene.

4. The method according to claim 1, further comprising:
   acquiring an ambient light intensity value by a light sensor; and
   when the ambient light intensity value is less than a preset light intensity threshold, determining that the current scene includes the indoor scene; and
   when the ambient light intensity value is greater than the preset light intensity threshold, determining that the current scene includes the outdoor scene.

5. A device for acquiring an image, implemented by a terminal having a camera component, comprising:
   a processor and a gyroscope; and
   a memory for storing instructions executable by the processor, wherein the processor is configured to:
   acquire gyroscope data from the gyroscope while acquiring images by the camera component;
   obtain a current scene for each acquired image and determine whether the current scene includes an indoor scene or an outdoor scene based on each acquired image;
   determine whether to perform optical anti-shake processing on each acquired image based on the acquired gyroscope data based on whether the current scene includes the indoor scene;
   when determining that a current scene includes an outdoor scene, acquire, by the camera component, each video image frame without the optical anti-shake processing; and
   perform electronic anti-shake processing on the video image frame, based on the gyroscope data corresponding to associated video image frames corresponding to the video image frame, for each acquired video image frame without the optical anti-shake processing, to acquire a smooth video image frame.

6. The device according to claim 5, wherein the processor is configured to:
   when determining that a current scene includes an indoor scene, perform optical anti-shake processing based on the acquired gyroscope data, by the camera component, to acquire each video image frame subjected to the optical anti-shake processing; and
   perform, based on image data of associated video image frames corresponding to the video image frame, electronic anti-shake processing on the video image frame, for each acquired video image frame subjected to the optical anti-shake processing, to acquire a smooth video image frame.

7. The device according to claim 5, wherein the processor is further configured to:
   acquire a currently configured photosensitivity suitable for the camera component; and
   when the photosensitivity is greater than a preset photosensitivity threshold, determine that the current scene includes the indoor scene; and when the photosensitivity is less than the preset photosensitivity threshold, determine that the current scene includes the outdoor scene.

8. The device according to claim 5, wherein the processor is further configured to:
acquire an ambient light intensity value by a light sensor; and
when the ambient light intensity value is less than a preset light intensity threshold, determine that the current scene includes the indoor scene; and
when the ambient light intensity value is greater than the preset light intensity threshold, determine that the current scene includes the outdoor scene.

9. A non-transitory computer-readable storage medium, having stored therein at least one instruction, at least one program, a code set or an instruction set, and the at least one instruction, the at least one program, the code set or the instruction set is loaded and executed by a processor to perform acts comprising:
acquiring gyroscope data from a gyroscope while acquiring images by a camera component;
obtaining a current scene for each acquired image and determining whether the current scene includes an indoor scene or an outdoor scene based on each acquired image;
determining whether to perform optical anti-shake processing on each acquired image based on the acquired gyroscope data based on whether the current scene includes the indoor scene;
when determining that a current scene includes an outdoor scene, acquiring, by the camera component, each video image frame without the optical anti-shake processing; and
performing, based on the gyroscope data corresponding to associated video image frames corresponding to the video image frame, electronic anti-shake processing on the video image frame, for each acquired video image frame without the optical anti-shake processing, to acquire a smooth video image frame.

10. The storage medium according to claim 9, wherein the processor is configured to perform acts comprising:
when determining that a current scene includes an indoor scene, performing optical anti-shake processing based on the acquired gyroscope data, by the camera component, to acquire each video image frame subjected to the optical anti-shake processing; and
performing, based on image data of associated video image frames corresponding to the video image frame, electronic anti-shake processing on the video image frame, for each acquired video image frame subjected to the optical anti-shake processing, to acquire a smooth video image frame.

11. The storage medium according to claim 9, wherein the processor is further configured to perform acts comprising:
acquiring a currently configured photosensitivity suitable for the camera component; and
when the photosensitivity is greater than a preset photosensitivity threshold, determining that the current scene includes the indoor scene; and
when the photosensitivity is less than the preset photosensitivity threshold, determining that the current scene includes the outdoor scene.

12. The storage medium according to claim 9, wherein the processor is further configured to perform acts comprising:
acquiring an ambient light intensity value by a light sensor; and
when the ambient light intensity value is less than a preset light intensity threshold, determining that the current scene includes the indoor scene; and
when the ambient light intensity value is greater than the preset light intensity threshold, determining that the current scene includes the outdoor scene.

* * * * *